April 6, 1948.　　　　M. A. STARR　　　　2,439,321
ELECTRICAL CIRCUIT
Filed Sept. 19, 1945　　　　2 Sheets-Sheet 1
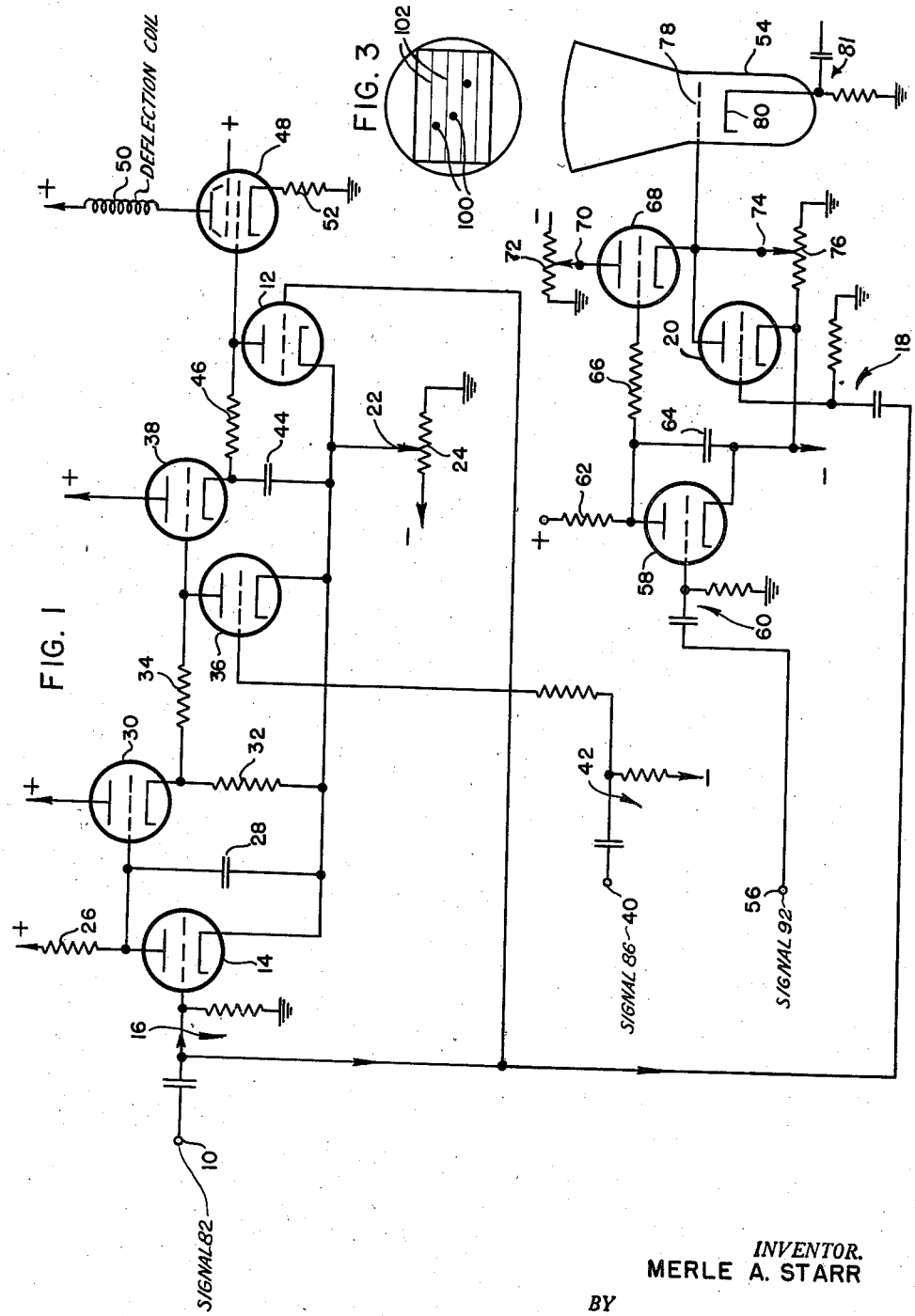
INVENTOR.
MERLE A. STARR
BY
William D. Hall
ATTORNEY

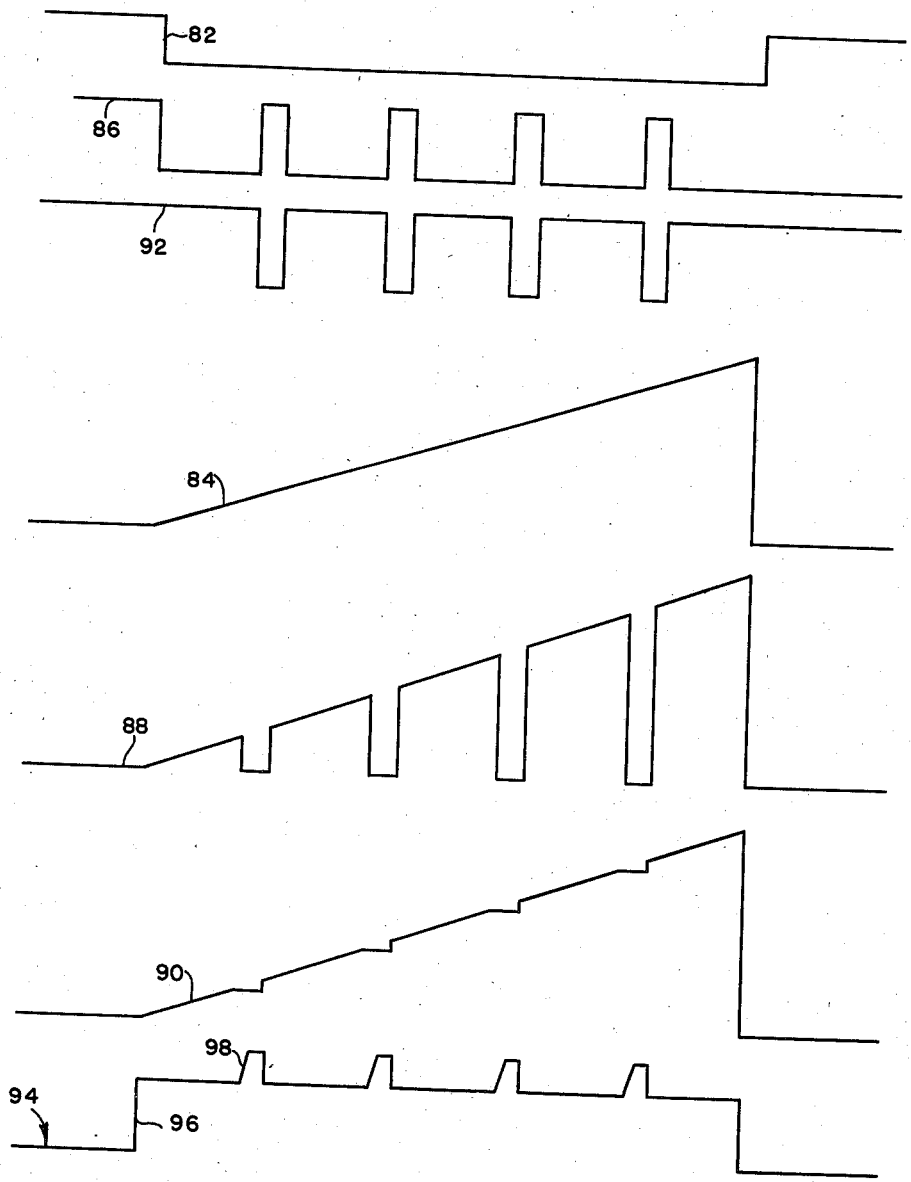

Patented Apr. 6, 1948

2,439,321

UNITED STATES PATENT OFFICE 2,439,321

ELECTRICAL CIRCUIT

Merle A. Starr, Belmont, Mass., assignor, by mesne assignments, to the United States of America as represented by the Secretary of War Application September 19, 1945, Serial No. 617,321

5 Claims. (Cl. 315—22)

This invention relates to electrical circuits and more particularly to sweep circuits for cathode ray tube indicators.

Cathode ray tube indicators for use with radio object locating systems employ a rapid linear sweep in one direction to provide a time base or so-called range sweep. A somewhat slower linear sweep is employed in a direction at right angles to the abovementioned range sweep to provide means of indicating angular deviation of the antenna of the radio object locating system from a reference line. Video signals representing target echoes are applied to the intensity grid or cathode of the cathode ray tubes thus causing bright or dark spots on the fluorescent screen of the cathode ray tube at positions indicative of the range and angular position of the detected target. Two types of indicators employing this form of presentation are the B-scope in which the azimuth of the target is represented on a horizontal scale and the range of the target is represented on a vertical scale and an E-scope in which the range to the target is represented on a horizontal scale and the elevation of the target is represented on a vertical scale.

In some types of radio object locating systems the azimuth and elevation scanning is very rapid resulting in a finite distance between range sweeps on the face of the cathode ray tube. If a bright line or series of bright lines are electronically placed on the face of cathode ray tube to indicate incremental changes in angular position of the antenna, it is necessary to momentarily stop the angular sweep on the tube to prevent these lines from shifting position on the face of the tube. If this precaution is not taken, the auxiliary or position lines will shift in position by an amount at least equal to the spacing between successive range sweeps.

It is an object of the present invention, therefore, to provide a simple novel circuit for applying position marks on the screen of a cathode ray tube.

It is a further object of this invention to provide a circuit for momentarily stopping the sweep on a cathode ray tube while said abovementioned position marks are being applied to the tube.

For a better understanding of the invention together with other and further objects thereof, reference is had to the following description taken in connection with the accompanying drawings in which:

Fig. 1 is a schematic wiring diagram of the preferred embodiment of the invention;

Fig. 2 is a series of graphs showing voltage waveforms present at selected points in the circuit of Fig. 1; and Fig. 3 is a view of the screen of a cathode ray tube shown in Fig. 1.

Referring now to Fig. 1, there is shown a terminal 10 providing means for introducing a negative voltage gate. No circuit is shown in Fig. 1 for producing this voltage gate but it is suggested that a so-called one-shot multivibrator triggered by a suitable pulse from a circuit associated with the radio object locating system is well suited to this purpose. Terminal 10 is connected to the control grids of triode vacuum tubes 12 and 14 through a conventional resistor-capacitor coupling network 16 and through a second resistor-capacitor network 18 to the control grid of triode vacuum tube 20. Vacuum tube 14 which forms a part of a sawtooth generator circuit has its cathode connected to a point of negative bias potential determined by the position of tap 22 on a potentiometer 24. Potentiometer 24 is connected between a point of negative potential and ground. A resistor 26 connected between the anode of vacuum tube 14 and a point of positive potential, and a capacitor 28 connected between the anode and cathode of tube 14 provide means for producing a voltage that rises linearly with time. The anode of tube 14 is directly connected to the control grid of a cathode follower amplifier tube 30 which has a load resistor 32 connected between its cathode and tap 22. The anode of tube 30 is connected to a point of positive potential. The cathode of tube 30 is connected through an isolating resistor 34 to the anode of a triode vacuum tube 36 and to the control grid of another triode vacuum tube 38. A terminal 40 that is connected to the control grid of tube 36 through a conventional resistor-capacitor coupling network 42 provides means for applying a series of positive pulses to tube 36. Coupling network 42 is returned to a point of negative potential. Again no circuit has been shown for producing these pulses but it is suggested that an unbalanced multivibrator or a sine wave controlled blocking oscillator may be used for producing these pulses. Many other types of circuits for producing these pulses are known to those familiar with the electronic art.

Vacuum tube 38 is connected in a type of cathode follower circuit. The cathode impedance for this circuit is a capacitor 44 rather than the resistive impedance normally employed. The cathode of tube 38 is connected through an isolating resistor 46 to the anode of tube 12 and to the control grid of a multigrid vacuum tube 48. The cathodes of tubes 12 and 36 are directly connected to tap 22 and the cathode of tube 38 is connected to this tap through capacitor 44. Tube 48 forms a part of an amplifier circuit which also includes a coil 50 as an anode load impedance and a resistor 52 as a cathode load impedance. Coil 50 is one deflection coil of a cathode-ray tube 54. The screen grid of tube 48 is maintained at a positive potential by suitable connection thereto. Coil 50 is shown detached from tube 54 to simplify the drawing. The above described circuit forms the sweep channel of the invention. This invention also includes a beam intensifying channel the description of which follows.

A series of negative pulses coincident in time with the pulses applied to terminal 40 are applied to a terminal 56. The source of these pulses is not shown since many conventional circuits are available for their generation. It is suggested, however, that a circuit similar to that described in connection with the pulses that are applied to terminal 40 may be employed or preferably a single source may be used for both sets of pulses with the source being directly connected to one terminal and connected to the second terminal through an inverter.

Terminal 56 is connected to the control grid of a triode vacuum tube 58 through a conventional resistor-capacitor network 60. Vacuum tube 58 together with resistor 62 and capacitor 64 form a sawtooth generator circuit. Resistor 62 is connected between a point of positive potential and the anode of tube 58 and capacitor 64 is connected between a point of negative potential and the anode of tube 58. The anode of tube 58 is connected through an isolating resistor 66 to the control grid of a triode vacuum tube 68. The anode of tube 68 is connected to a tap 70 on a potentiometer 72 and the cathode of tube 68 is connected to a tap 74 on a potentiometer 76 to the intensity grid 78 of cathode ray tube 54 and to the anode of tube 29. Potentiometers 72 and 76 are both connected between ground and a point of negative potential and the cathode of tube 29 is connected to the ungrounded end of potentiometer 76. The cathode 80 of cathode ray tube 54 is connected to ground through a resistor-capacitor network 81. This network provides means for applying video target signals to cathode 80.

In the description of the operation of the above circuit which follows reference is made to the waveforms shown in Fig. 2. The waveforms in Fig. 2 are all drawn to the same time scale which extends in a horizontal direction. Distances in a vertical direction represent voltage in each waveform but the waveforms are not drawn to a common scale nor do they have a common reference line. The scale and reference line for the waveforms will be fully described when it is necessary for this data to be introduced in order to understand the invention.

The operation of this circuit is as follows: A negative gate voltage having a voltage time relationship similar to that illustrated by waveform 82, Fig. 2, is applied to terminal 10. The length of this voltage gate is equal to the time required for the scanning antenna to move through the angle to be represented on cathode ray tube 54 of Fig. 1. In certain types of indicators this time may be approximately 8,500 microseconds. This value is only an example since the value chosen obviously depends upon the particular application of the indicator. This negative gate is of sufficient amplitude to cause plate current cutoff in tube 14 which in turn allows the potential across capacitor 28 to rise exponentially. The impedances of capacitor 28 and resistor 26 are so chosen that the exponential rise approximates a linear rise for the duration of the negative gate applied to terminal 10. The rise in potential of anode of tube 14 is illustrated by waveform 84, Fig. 2. This same waveform will appear at a slightly reduced amplitude at the cathode of tube 38. The rising voltage at the cathode of tube 38 will normally appear at the grid of tube 38 with little or no voltage drop across resistor 34. The rise in potential of the cathode of tube 38 will follow very closely the rise in potential of the grid of this tube since capacitor 44 charges through the low impedance of tube 38. Normally tube 36 is held cut off by the negative potential applied to its control grid but a series of positive rectangular voltage pulses similar to those illustrated by waveform 86 are applied to terminal 40 to cause tube 36 to conduct for the duration of these pulses. When tube 36 conducts the grid of tube 38 is clamped at the potential of tap 22 on potentiometer 24 so that no charge is added to capacitor 44 during this time. Tube 12 is cut off during the time that tube 14 is cut off so capacitor 44 cannot discharge when the grid of tube 38 drops below cut-off potential. The potential at the grid of tube 38 as a function of time will be similar to that shown by waveform 88, Fig. 2. The potential at the control grid of tube 48 as a function of time is shown by waveform 90. It can be seen that the potential on the grid jumps rapidly to the value it would have reached in a linear rise immediately after tube 36 is cut off. Since the current through deflection coil 50 is controlled by the potential of the control grid of tube 48, waveform 90 also represents the current through coil 50 as a function of time. The initial current flowing through tube 48 is determined by the position of tap 22 on potentiometer 24. At the end of the negative gate that is applied to terminal 10 tube 14 conducts discharging capacitor 28. Tube 12 also conducts at the end of this gate and this action allows capacitor 44 to completely discharge through resistor 46. Interpreting waveform 90 in terms of the deflection of the electron beam, it can be seen that the position of tap 22, Fig. 1, may be so adjusted that the electron beam is initially deflected downward toward the lower edge of the screen on cathode ray tube 54. The electron beam will be deflected upward from this position by the increase in current in coil 50. When the current in coil 50 remains stationary for an instant, the deflection of the electron beam will remain constant for a like period of time. As soon as the current again increases in coil 50 the electron beam will be deflected still further upward. If the constants of the circuit are properly selected, the electron beam will be directed toward some point near the top edge of tube 54 at the end of the gate that is applied to terminal 10.

The above described circuit provides means for momentarily stopping one sweep of cathode ray tube 54 at a series of equally spaced positions. If the electron beam is intensified during these stationary periods, the range sweep which has not been interrupted by this circuit will cause a series of bright lines to appear on the screen of tube 54. If the antenna of the radio object locating system is moving with a uniform velocity, these lines will represent equal angular displacements of the antenna. One method of intensifying the electron beam in tube 12 would be to apply the positive pulses present at terminal 40 to the grid 78 of cathode ray tube 54. This is undesirable because tube 54 would be intensified immediately after the grid of tube 48 is clamped at a fixed potential and any transients set up in coil 50 due to the abrupt change in the rate of increase in current in this coil would cause the line on the fluorescent screen to be broad and irregular. For this reason a means for delaying the intensification of the electron beam for a few microseconds is provided.

Tube 20 is normally conducting in the absence of a negative gate at terminal 10. Thus the cathode of tube 66 and hence the grid 78 of tube 54 is held at a high negative potential. This causes cutoff of the electron beam in tube 54. When the negative gate is applied to the control grid of tube 20, this tube is cut off and the potential of the cathode of tube 66 rises to the potential determined by the position of tap 74. This tap is set so that tube 54 operates just below the threshold of luminosity so that negative video pulses on cathode 80 will cause bright spots to appear on the fluorescent screen of tube 54.

A series of negative voltage pulses occurring in time coincidence with the pulses applied to terminal 40 are applied to terminal 56. These negative pulses are shown as waveform 92 of Fig. 2. These negative pulses are applied to tube 58 which is normally conducting but which is cut off by the negative pulses. With tube 58 cut off the anode of this tube starts rising exponentially from a potential somewhat below ground toward the positive potential to which resistor 62 is connected. This rise in potential is coupled to the control grid of tube 68. Tube 68 is normally cut off when tube 20 is cut off but is made conducting by the rise in potential on the control grid. There will be a delay between the start of the sawtooth and the time of conduction due to the finite slope of the sawtooth voltage. When tube 68 starts to conduct, the potential of the cathode of this tube starts to rise due to plate current flow in potentiometer 76. The amount of this rise in potential will be limited by the potential of tap 70. Tap 70, therefore, determines brightness of the position line on the cathode ray tube. Waveform 94, Fig. 2, shows the initial rise in potential 96 of grid 78 and the additional positive pulses 98 that produce the position lines on the screen of tube 54. The width of pulses 98 is not critical but it should be wide enough to allow at least one complete range sweep for each pulse. The width of these pulses should not be too great, however, because distortion of the presentation will result in the region of the position lines. The pulses 98 shown in waveform 94 are wider than necessary for best operation but are shown at their present width to more clearly illustrate the principle of the invention.

Fig. 3 shows a view of the screen of cathode ray tube 54 when this tube is connected as an E scope. Target indications are shown as dark spots 100 and position lines are shown by the dark lines 102.

It will be obvious to those skilled in the art that while this circuit has been described as an indicator for use with a radio object locating system its use is by no means limited to this application. The sweep circuit alone might be used to stop a fast sweep on the conventional cathode ray tube indicator for the purpose of placing accurately spaced timing marks on the screen. Therefore, while there has been described what is at present considered the preferred embodiment of the invention, all changes and modifications that fall fairly within the scope of the invention are claimed as a part of this invention.

What is claimed is:

1. In an indicator circuit the apparatus comprising a cathode ray tube having at least a cathode, an intensity grid and a set of deflection coils, a first sawtooth generator means, a first cathode follower means responsive to the output of said first sawtooth generator, a second cathode follower, first resistive means for connecting the output of said first cathode follower to the input of said second cathode follower, a first voltage amplifier employing one of said deflection coils in said cathode ray tube as an anode impedance, second resistive means for connecting the output of said second cathode follower to the input of said first amplifier, a first potentiometer for establishing a point of fixed potential, a first vacuum tube switch for connecting the input of said second cathode follower to the fixed potential determined by said first potentiometer, a second vacuum tube switch means for connecting the input of said first amplifier to the point of fixed potential determined by said first potentiometer, a second potentiometer for determining a point of fixed potential, means for connecting said intensity grid to said potentiometer, a third vacuum tube switch for connecting said intensity grid to a point more negative in potential than that determined by said second potentiometer, a second sawtooth generator, means including a resistor and a vacuum tube for connecting the output of said second sawtooth generator to said intensity grid, a third potentiometer for limiting the rise in potential on said intensity grid, means for applying video signals to the cathode of said cathode ray tube, means for applying a relatively long negative gate to said first sawtooth generator, said second vacuum tube switch, and said third vacuum tube switch whereby said first sawtooth generator produces a rising voltage that is substantially linear with time, whereby said input of said first amplifier is allowed to rise above the fixed potential determined by said first potentiometer, and whereby said intensity grid rises to the potential determined by said second potentiometer, means for applying a plurality of relatively narrow positive gates to said first vacuum tube switch whereby the output of said first cathode follower is effectively disconnected from the input of said second cathode follower for the duration of said gates thereby momentarily stopping the sweep on said cathode ray tube, and means for applying a plurality of relatively narrow negative gates to said second sawtooth generator, said last mentioned gates occurring in time coincidence with the positive gates applied to said first switch tube whereby positive voltage pulses are applied to said intensity grid a short time interval after said gates are applied to said second sawtooth generator thereby causing luminous indications to appear on said cathode ray tube at instants when the electron beam in said tube is stationary.

2. A method of placing spaced position marks on the screen of a cathode ray tube comprising the steps of cyclically sweeping the beam of said cathode ray tube between two spaced limits, interrupting the sweep of said beam at predetermined points intermediate said limits, momentarily clamping said beam in said intermediate position and intensifying said beam while clamped in said intermediate position thereby causing stationary luminous position marks to appear on the screen of said cathode ray tube.

3. In an indicator circuit the apparatus comprising a cathode ray tube including at least a viewing screen a beam deflecting means, and an intensity control means, a sweep generator means, an amplifier means operatively connected to said beam deflecting means, means including a switch means and a signal storage means connecting said sweep generator means to said amplifier means, means for rendering said switch means operative at periodic intervals, and means for applying a signal to said intensity control means while said switch means is operative whereby said signal causes spaced position marks to appear on said screen at times when the deflection of the beam of said cathode ray tube due to said beam deflecting means is not changing.

4. In an indicator circuit the apparatus comprising a cathode ray tube having at least a deflection coil, a sawtooth generator means, a first cathode follower means responsive to the output of said sawtooth generator means, a second cathode follower, means connecting the output of said first cathode follower to the input of said second cathode follower, a voltage amplifier employing said deflection coil as an anode impedance, means for connecting the output of said second cathode follower to the input of said amplifier, switch means for connecting the input of said second cathode follower to a point of negative potential, means for alternately rendering said sawtooth generator operative and inoperative at a periodic rate, and means for periodically rendering said switch means operative during the periods that said sawtooth generator is operative whereby the beam of said cathode ray tube is caused to scan in response to the signal from said sawtooth generator means, and whereby the scanning of said beam is interrupted and the deflection of said beam maintained constant during the times said switch means is operative.

5. In an indicator circuit the apparatus comprising a cathode ray tube having at least a deflection coil and an intensity control means, a sawtooth generator means, a first cathode follower means responsive to the output of said sawtooth generator means, a second cathode follower, first resistive means connecting the output of said first cathode follower to the input of said second cathode follower, a voltage amplifier employing said deflection coil as an anode impedance, second resistive means for connecting the output of said second cathode follower to the input of said amplifier, a first vacuum tube switch for connecting the input of said second cathode follower to a point of negative potential, second vacuum tube switch means connecting the input of said amplifier to a point of negative potential, means for alternately rendering said sawtooth generator means operative and inoperative at a periodic rate, means for rendering said second switch operative when said sawtooth generator is inoperative, means for periodically rendering said first switch means operative during the period said sweep generator is operative and means for applying a signal to said intensity control of said cathode ray tube at times when said first switch means is operative whereby the deflection of the beam of said cathode ray tube due to said deflection coil is maintained constant during the period that the intensity of said beam is altered by said signal applied to said intensity control.

MERLE A. STARR.

REFERENCES CITED

The following references are of record in the file of this patent:

UNITED STATES PATENTS

| Number | Name | Date |
| --- | --- | --- |
| 2,280,531 | Norgaard | Apr. 21, 1942 |